(12) United States Patent
Lee

(10) Patent No.: US 8,738,096 B2
(45) Date of Patent: May 27, 2014

(54) INPUT DEVICE FOR MOBILE TERMINAL

(75) Inventor: Jun-Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1301 days.

(21) Appl. No.: 12/032,163

(22) Filed: Feb. 15, 2008

(65) Prior Publication Data

US 2008/0242377 A1 Oct. 2, 2008

(30) Foreign Application Priority Data

Mar. 30, 2007 (KR) ........................ 10-2007-0031492

(51) Int. Cl.
*H04M 1/00* (2006.01)
(52) U.S. Cl.
USPC .................................... 455/575.1; 455/575.4
(58) Field of Classification Search
CPC ..................................................... H04M 1/0235
USPC ................................... 455/575.1, 575.8, 128
See application file for complete search history.

(56) References Cited

U.S. PATENT DOCUMENTS

| 4,640,994 A | * | 2/1987 | Komaki ........................ 200/5 A |
| 5,917,165 A | * | 6/1999 | Platt et al. ..................... 200/600 |
| 2003/0080880 A1 | * | 5/2003 | Kaino et al. .................... 341/22 |
| 2005/0116334 A1 | * | 6/2005 | Buehler ....................... 257/704 |
| 2007/0114368 A1 | * | 5/2007 | Idzik et al. ............... 250/227.22 |

FOREIGN PATENT DOCUMENTS

KR 200194628 6/2000

* cited by examiner

*Primary Examiner* — Huy C Ho
(74) *Attorney, Agent, or Firm* — H.C. Park & Associates, PLC

(57) ABSTRACT

An input device for a mobile terminal includes a touch unit disposed on a surface of a housing of the mobile terminal, a conductive member disposed on an inner surface of the housing in a position corresponding to the touch unit, and a touch sensor to sense an operation of the touch unit through the conductive member and generate a corresponding signal. The touch sensor is provided within the housing in a position corresponding to the conductive member.

11 Claims, 5 Drawing Sheets

INPUT DEVICE FOR MOBILE TERMINAL

CROSS REFERENCE TO RELATED APPLICATION

This application claims priority from and the benefit of Korean Patent Application No. 10-2007-0031492, filed on Mar. 30, 2007, which is hereby incorporated by reference for all purposes as if fully set forth herein.

BACKGROUND OF THE INVENTION

1. Field of the Invention

The present invention relates to a mobile terminal, and more particularly to an input device for a mobile terminal.

2. Discussion of the Background

Generally, a mobile terminal is a portable device that enables a user to wirelessly communicate with another party. Such a mobile terminal may be categorized, according to its external shape, as a bar-type terminal, a flip-type terminal, or a folder-type terminal, and according to the manner in which the mobile terminal opens/closes, as a rotary-type or a slide-type terminal.

Wireless communication services include transferring of voice communication and text messages and are expanding to also include multimedia services, such as transferring of images and moving pictures. Also, an additional unit such as a camera lens has gradually become an essential component of a mobile terminal. Such a mobile terminal is provided with function/data-input keys for accessing various menus, functions, etc. Also, in order to provide convenience to a user of a terminal, exposed function keys are often provided. However, when function keys of a general keypad type are exposed, they may protrude from the exterior of the terminal, thereby degrading the terminal's design. Recently, function keys have been provided in a terminal in the form of a touch keypad so as to prevent the keys from protruding from the exterior of the terminal. When a user touches the exterior of the terminal, function keys of a touch keypad type sense it and activate internal functions of the terminal. By using a touch keypad, it may be possible for the exterior of a terminal to be desirably designed and for a user to easily operate the terminal.

A touch keypad may include a sensor provided within a terminal. When a certain portion of a terminal case is touched, the touch keypad senses it and generates a corresponding signal. The sensor may be provided in a printed circuit board (PCB) and may be disposed far from the terminal case. Therefore, the sensor's ability to sense a touch of a user on the terminal case may be limited.

In order to solve the problem, a sensor attached to a flexible printed circuit board (FPCB), instead of a general PCB, may be disposed on an inner surface of the terminal case, and welded thereto by heat treatment. The sensor senses a key-operation of a user through the FPCB. However, the manufacturing process may be complicated and the cost may be increased due to an attachment process of an FPCB.

SUMMARY OF THE INVENTION

The present invention provides an input device for a mobile terminal that may simplify a manufacturing process and reduce a manufacturing cost thereof.

The present invention also provides an input device for a mobile terminal that may embody a desirable terminal design.

Additional features of the invention will be set forth in the description which follows, and in part will be apparent from the description, or may be learned by practice of the invention.

The present invention discloses an input device for a mobile terminal. The device includes a touch unit disposed on a surface of a housing of the mobile terminal, a conductive member disposed on an inner surface of the housing in a position corresponding to the touch unit, and a touch sensor to sense an operation of the touch unit through the conductive member and generate a corresponding signal. The touch sensor is disposed within the housing in a position corresponding to the conductive member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
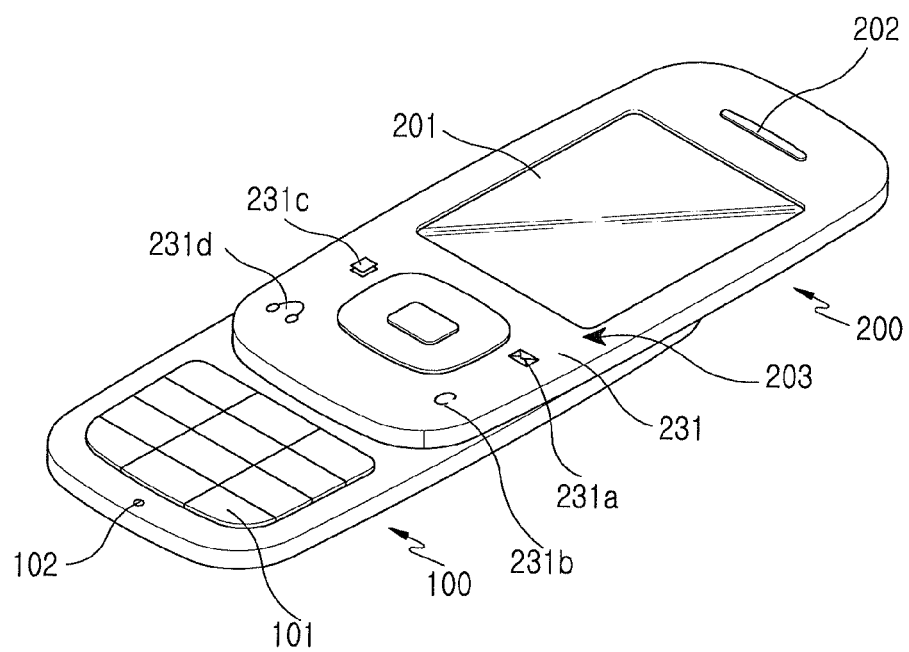
FIG. 1 is a perspective view showing a mobile terminal including an input device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

FIG. 1 is a perspective view showing a mobile terminal including an input device according to an exemplary embodiment of the present invention. A mobile terminal 10 according to an exemplary embodiment of the present invention includes a first housing 100 and a second housing 200, and the first and second housings 100 and 200 are coupled with each other to be movable in a sliding manner.

The first housing 100 is provided with a keypad 101 and a transmitter 102 on a lower portion of a side surface thereof.

The keypad 101 includes a plurality of keys, and designated signal values are printed on one side surface of each key. By pressing the keypad 101, a number, a character, etc. may be input. The transmitter 102 may include a built-in microphone and may be disposed near the keypad 101. Thus, a user's voice to transmit to another party may be input to the transmitter 102.

The second housing 200 is movable along the first housing 100 in a sliding manner. When the second housing 200 is moved along the first housing 100, a lower portion of the first housing 100 is exposed and the keypad 101 and the transmitter 102 are exposed. Also, one side surface of the second housing 200 may be provided with a display unit 201, a receiver 202, and an input device 203.

The display unit 201 may include any of various display units, such as a liquid crystal display (LCD), an organic electroluminescent display, or the like. Further, it may indicate status information of the terminal 10, data transmission/reception information, the contents of a received text message, input values by an operation of the keypad 101, etc.

The receiver 202 may be disposed near the display unit 201 and may include a built-in speaker to output a voice received to the terminal 10, a sound of a saved music file, or the like. Also, the receiver 202 and the transmitter 102 may function together so that a user can make a voice call with another party by using the terminal 10.

The input device 203 may be located on a lower portion of the second housing 200 and may be used to access various functions of the terminal 10. This exemplary embodiment shows that the input device 203 may be disposed on the second housing 200, but it is possible for the input device 203 to be disposed on the first housing 100.

Figure 2:
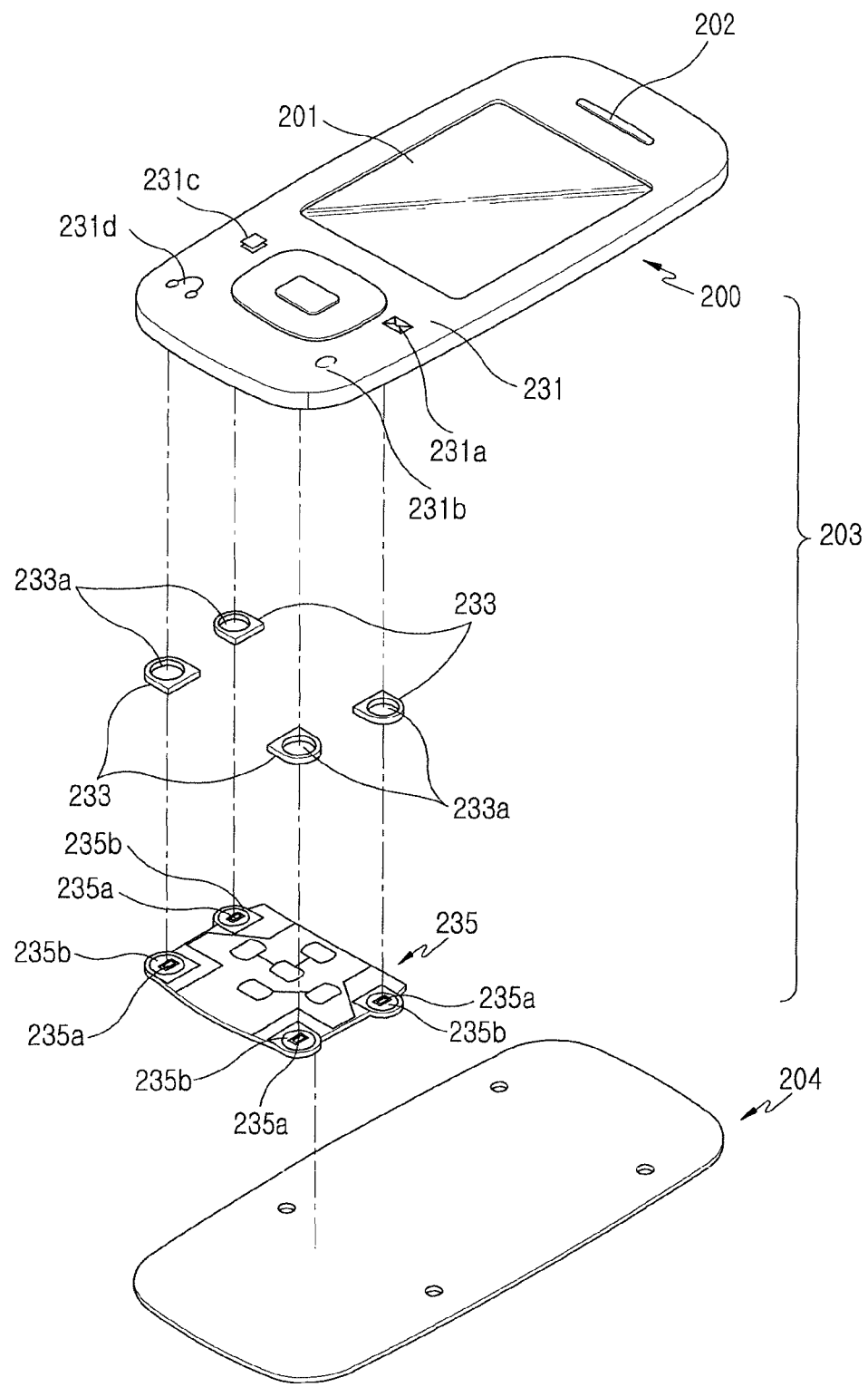
FIG. 2 is an exploded perspective view showing an input device of a second housing shown in FIG. 1.
Figure 3:
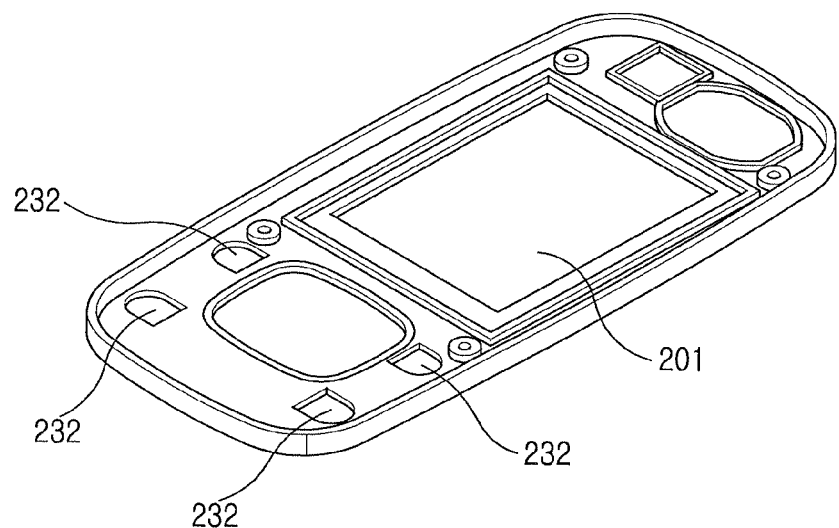
FIG. 3 is a perspective view showing an inner surface of a second housing shown in FIG. 1
Figure 4:
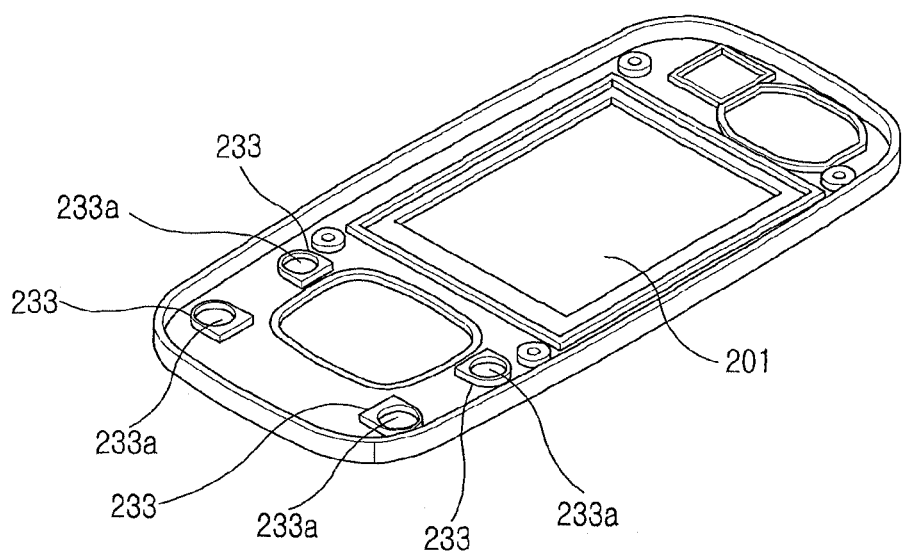
FIG. 4 is a perspective view showing a conductive member provided on an inner surface of a second housing shown in FIG. 3.
Figure 5:
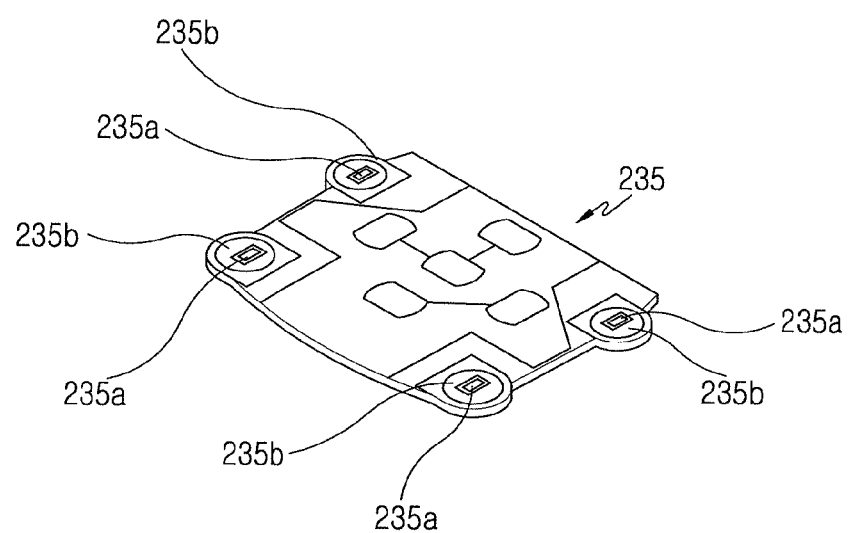
FIG. 5 is a perspective view showing a printed circuit board of an input device shown in FIG. 2.

FIG. 2 is an exploded perspective view showing an input device 203 of a second housing 200 shown in FIG. 1, FIG. 3 is a perspective view showing an inner surface of a second housing 200 shown in FIG. 1, FIG. 4 is a perspective view showing a conductive member 233 provided on an inner surface of a second housing 200 shown in FIG. 3, and FIG. 5 is a perspective view showing a printed circuit board 235 of an input device 203 shown in FIG. 2. As shown in FIG. 2, FIG. 3, FIG. 4, and FIG. 5, an input device 203 for a mobile terminal 10 according to an exemplary embodiment of the present invention may include a touch unit 231, a conductive member 233, and a printed circuit board 235.

The touch unit 231 may include at least one unit formed on one side surface of the second housing 200 and may be operated by a touch of a user's body on the touch unit 231. Also, icons 231a, 231b, 231c, and 231d may be printed on the touch unit 231. The touch unit 231 generates signals corresponding to the icons 231a, 231b, 231c, and 231d. When the icons 231a, 231b, 231c, and 231d are touched by the user, different functions of the terminal 10 operate. In this exemplary embodiment, the icons 231a, 231b, 231c, and 231d are referred to as a first icon 231a, a second icon 231b, a third icon 231c, and a fourth icon 231d, respectively. The first icon 231a is used to display a menu related to transmission/reception of a text message on the display unit 201, the second icon 231b is used to return an operation menu of the terminal 10 to a previous step or to cancel the menu, the third icon 231c is used to display a menu window for selecting a menu related to various functions of the terminal 10 on the display unit, and the fourth icon 231d is used to display a menu related to selection and a playback of a saved music file of the terminal 10 on the display unit 201. In this exemplary embodiment, although only the specific functions of the icons 231a, 231b, 231c, and 231d are described, it may be possible to perform other functions in lieu of or in addition to the above described functions.

The conductive members 233 may be disposed on an inner surface of the second housing 200, and may be arranged to corresponding to the icons 231a, 231b, 231c, and 231d printed on the touch unit 231. The conductive members may be manufactured to be electrically conductive by mixing an insulator, such as rubber, with a black pigment or metal fiber. Therefore, the conductive members 233 may be stably disposed on an inner surface of the second housing 200 and may transfer an operation of the touch unit 231 to the printed circuit board 235.

Mounting grooves 232, which receive the conductive members 233, may be disposed on an inner surface of the second housing 200. The mounting grooves 232 may correspond to the icons 231a, 231b, 231c, and 231d printed on the touch unit 231. Therefore, the conductive members 233 may be inserted into the mounting grooves 232, and thus are disposed on an inner surface of the second housing 200 to correspond to the icons 231a, 231b, 231c, and 231d. Here, an injection molded product forming the second housing 200 may be manufactured to have a thickness of more than 0.5 mm in consideration of external impact strength on the second housing 200 and less than 1.6 mm in consideration of sensitivity of a sensor for sensing an operation of the touch unit 231. Therefore, the conductive members 233 inserted in the mounting grooves 232 may be spaced apart from the touch unit 231 by 0.5 mm to 1.6 mm. So as to sufficiently secure sensitivity of the sensor, a thickness of the injection molded product forming the second housing 200, that is, a space between the conductive members 233 and the touch unit 231, may be less than 1.5 mm. Specifically, the space is the distance between an operating portion of the touch unit 231 and the conductive members 233, wherein the conductive members are inserted in the mounting grooves 232 and tightly coupled with the grooves. Some portions of the conductive members 233 inserted in the mounting grooves 232 may protrude from an inner surface of the second housing 200.

Each conductive member 233 may include a through hole 233a penetrating from one side surface to the other side surface thereof. As the conductive members 233 are inserted in the mounting grooves 232, one end portion of each through hole 233a is disposed near an inner surface of each mounting groove 232.

The printed circuit board (PCB) 235 is provided within the second housing 200, and sensing units including touch sensors 235b and light emitting devices (LEDs) 235a are provided in some portions of the PCB. Also, when the PCB 235 is provided within the second housing 200, the conductive members 233 are disposed to correspond to the touch sensors 235b. Here, the conductive members 233 are mounted in the mounting grooves 232, so that an operation of the touch unit 231 may be transferred to the PCB 235 through the conductive members 233.

The touch sensor 235b may be in a ring form corresponding to the conductive member 233. Also, the touch sensor 235b is connected to the conductive member 233 inserted in the mounting groove 232, and the conductive member 233 is disposed between an inner surface of the second housing 200 and the PCB 235, specifically, the touch sensor 235b. When the touch unit 231 is operated, the touch sensor 235b senses it through the conductive member 233, and generates a corresponding signal. The signal generated by the touch sensor 235b operates the terminal 10 through the PCB 235. Also, when an external force or an external impact is applied to the second housing 200, the conductive member 233 may absorb the impact. Therefore, the touch sensor 235b can not only sense an operation of the touch unit 231 through the conductive member 233, but also may stably maintain the connection status with the conductive member 233 even when an external impact is applied.

The touch sensor 235b may be in a form corresponding to the conductive member 233, and the LED 235a surrounded by the touch sensor 235b may be disposed within the through hole 233a. When the LED 235a emits light, the emitted light travels through the through hole 233a of the conductive member 233 toward the touch unit 231. Therefore, the light emitted from the LED 235a may be emitted through one of the icons 231a, 231b, 231c, and 231d printed on the touch unit 231 via the through hole 233a. Therefore, a user may use the input device 203 and check the icons 231a, 231b, 231c, and 231d even in a dim environment.

In this exemplary embodiment, a housing plate 204 may be provided on an inner surface of the second housing 200, in which the housing plate 204 is designed for maintaining an arrangement of the conductive member 233 and the PCB 235 and may be coupled with the second housing 200. Here, the disposed conductive member 233 is tightly coupled with the mounting groove 232 and the touch sensor 235b. Components for enabling the second housing 200 to slide above the first housing 100 are disposed on a side surface of the housing plate 204.

As described above, an input device for a mobile terminal according to exemplary embodiments of the present invention includes a touch unit, a conductive member, and a touch sensor, so as to operate the terminal. Icons may be printed on a touch unit, and each icon-printed touch unit may be touched by a user's body. Here, a touch sensor senses a touch of the user's body on the touch unit through a conductive member and generates a signal corresponding to each of the icons printed on the touch unit. Also, the signal generated from the touch sensor may enable the terminal to operate. That is, the conductive member may link the touch unit with the touch sensor so that the touch sensor generates a signal according to a touch of the touch unit. Therefore, not only may the manufacturing cost be reduced because the input device includes a conductive member instead of a flexible printed circuit board, but also the manufacturing process may be simplified because only a simple insertion process is carried out. Also, the conductive member may include rubber so the conductive member may be stably disposed between the touch unit and the touch sensor even when an external impact is applied. Further, it may be possible to embody a desirable terminal design, because icons are printed on the touch unit touched by a user's body so there may be no portion protruding from the exterior of the mobile terminal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An input device for a mobile terminal, comprising:
   a touch unit disposed on an outer surface of a housing of the mobile terminal;
   a conductive member disposed on an inner surface of the housing in a position corresponding to the touch unit, the conductive member being electrically conductive;
   a touch sensor to sense an operation of the touch unit through the conductive member and generate a corresponding signal, the touch sensor being disposed within the housing in a position corresponding to the conductive member; and
   a mounting groove disposed on the inner surface of the housing, the conductive member being disposed in the mounting groove and disposed between the touch unit and the touch sensor.

2. The input device of claim 1, further comprising an icon printed on the touch unit, wherein the corresponding signal corresponds to the icon.

3. The input device of claim 2, further comprising a light emitting device (LED) to emit light disposed near the touch sensor, wherein the conductive member conducts the light emitted by the LED toward the touch unit.

4. The input device of claim 3, wherein the conductive member further comprises a through hole, and the light emitted from the LED passes through the through hole.

5. The input device of claim 4, wherein the touch sensor is disposed to correspond to the conductive member, and the LED is surrounded by the touch sensor and is disposed within the through hole.

6. The input device of claim 1, wherein the conductive member comprises rubber, and the conductive member inserted in the mounting groove is connected to the touch sensor.

7. The input device of claim 6, wherein the conductive member is to absorb an external force applied to the housing and to maintain a connection between the conductive member and the touch sensor.

8. The input device of claim 1, further comprising a printed circuit board in which the touch sensor is disposed, wherein the signal generated from the touch sensor operates the terminal through the printed circuit board.

9. The input device of claim 1, wherein a space between the touch unit and the conductive member is more than 0.5 mm and less than 1.6 mm.

10. The input device of claim 9, wherein the space between the touch unit and the conductive member is more than 0.5 mm and less than 1.5 mm.

11. The input device of claim 1, wherein the touch unit is configured to operate in response to a contact by a user.

* * * * *